United States Patent [19]
Schick

[11] Patent Number: 6,085,897
[45] Date of Patent: Jul. 11, 2000

[54] CONVEYOR-BELT CLIP AND METHOD OF MOUNTING SAME

[75] Inventor: Jean-François Schick, Saint Christol lez Ales, France

[73] Assignee: Vi-Goro Sarl, Nimes, France

[21] Appl. No.: 09/093,671

[22] Filed: Jun. 8, 1998

[30] Foreign Application Priority Data

Jun. 7, 1997 [DE] Germany ............................ 197 24 084

[51] Int. Cl.⁷ ................................................. B65G 15/30
[52] U.S. Cl. ...................... 198/844.2; 24/33 B; 24/33 P
[58] Field of Search ................. 198/617, 844.2; 24/33 F, 33 P, 33 B; 474/257, 255

[56] References Cited

U.S. PATENT DOCUMENTS

| | | | |
|---|---|---|---|
| 4,344,209 | 8/1982 | Harwood | 198/844.2 |
| 5,234,101 | 8/1993 | Herold | 198/844.2 |
| 5,236,079 | 8/1993 | Herold | 198/844.2 |
| 5,539,959 | 7/1996 | Schick | 24/33 B |
| 5,638,582 | 6/1997 | Klatt et al. | 198/844.2 |
| 5,669,114 | 9/1997 | Jakob | 198/844.2 |
| 5,884,369 | 3/1999 | Schick | 198/844.2 |
| 5,890,266 | 4/1999 | Herold | 198/844.2 |

FOREIGN PATENT DOCUMENTS 2843872   6/1990   Germany ............................ 198/844.2

*Primary Examiner*—Robert P. Olszewski
*Assistant Examiner*—Steven B. McAllister
*Attorney, Agent, or Firm*—Herbert Dubno; Andrew Wilford

[57] ABSTRACT

A connector for a flat belt having an end with front and back faces has a U-section end clip having front and back legs adapted to embrace the belt end against the respective faces thereof and a bight portion interconnecting outer ends of the legs. Each leg is formed with at least two throughgoing holes that align with the holes of the leg on the opposite face of the belt. A relatively soft metal plate extending a full width of the belt end lies between the front leg and the front face of the belt. Staples driven through the holes from the front face of the belt pierce through the soft metal plate and are crimped over on the back leg.

7 Claims, 1 Drawing Sheet

CONVEYOR-BELT CLIP AND METHOD OF MOUNTING SAME

FIELD OF THE INVENTION

The present invention relates to a conveyor-belt clip. More particularly this invention concerns such a clip and a method of mounting it on the end of a conveyor belt.

BACKGROUND OF THE INVENTION

A connector for a flat belt comprises at least one pair of U-section end clips interconnected by a transverse coupling pin or rod. Each such clip typically is made of metal and has a pair of legs adapted to embrace the respective belt end and a bight portion interconnecting the outer ends of the legs. Each leg in turn is formed with at least two throughgoing holes that align with the holes of the leg on the opposite face of the belt, and staples are driven through the registering holes from one side of the belt and are crimped over on the other side. The bight portion is formed as at least one loop or knuckle and the loops of the clip or clips of one belt end are interleaved with those of the other belt end and the coupling pin passes through the resultant passage to couple the two belt ends together. The result is a very solid hinged connection.

Due to the large tensile forces in the belt, it is essential that the clips be solidly attached to the belt ends, hence the use of two-leg staples whose legs are normally crimped over. The problem is that the staples are difficult to drive straight through the belt so that they exit the belt and pass through the holes in the leg on the back side of the belt. The main reason for this is that the belt is compressed locally where the staple is driven through so it deflects the staple tip laterally. In order to make it more likely that the staple will exit the belt and pass through the holes in the far side of the clip, these holes are made somewhat larger than necessary. The result when the system works properly is a loose fit here which can lead to chafing and wear.

OBJECTS OF THE INVENTION

It is therefore an object of the present invention to provide an improved belt-connector clip and method of mounting same on a conveyor-belt end.

Another object is the provision of such an improved belt-connector clip and method of mounting same on a conveyor-belt end which overcomes the above-given disadvantages, that is which guarantees that the fixing staples or their legs when driven in penetrate the webbing end without any offset while ensuring precise penetration into the guide holes of the clip leg on the other side of the webbing and hence satisfactory fixing of the connector clips.

SUMMARY OF THE INVENTION

A connector for a flat belt having an end with front and back faces has according to the invention a U-section end clip having front and back legs adapted to embrace the belt end against the respective faces thereof and a bight portion inter-connecting outer ends of the legs. Each leg is formed with at least two throughgoing holes that align with the holes of the leg on the opposite face of the belt. A relatively soft metal plate extending a full width of the belt end lies between the front leg and the front face of the belt. Staples driven through the holes from the front face of the belt pierce through the soft metal plate and are crimped over on the back leg.

The invention is based on the realization that during the driving in of the staples in the conventional manner the webbing end is flattened and therefore tends to widen as a result of the clip legs being pressed down onto the belt as the staples are driven therethrough. Such widening of the belt results in a curvature that normally impedes satisfactory driving in of the staples, tending to deflect them laterally so they do not engage through the holes in the staple leg on the back side of the belt.

When however the soft plate according to the invention is used, the load is distributed and there is less local deformation of the belt. The staples pass straight through a relatively uncompressed belt so that they pass perfectly through the holes in the back leg of the clip. In addition according to the invention the plate forms collars projecting into the belt around the staple where the staple is pierced through the plate. These collars are automatically formed as the staple pushes through the soft metal plate and pushes material from the opposite face of the plate, thereby solidly anchoring the plate in the webbing of the belt.

In accordance with the invention the plate is made of a nonferrous metal or of sheet metal, for instance an iron or mild steel sheet metal can be used.

The according to the invention staples have the following percentage composition by weight C=0.70/0.80 or 0.80/0.90
Mn=0.50/0.80
P<0.035
S<0.035
Si<0.20/0.40. With the lower carbon content a tensile strength of 1650/1800 N/mm$^2$ and with the higher carbon content a tensile strength of 1820/2020 N/mm$^2$ is achieved.

The method of mounting a belt connector on a belt end with front and back faces has according to the invention the steps of first fitting to the belt a U-section end clip having front and back legs and a bight portion interconnecting outer ends of the legs with the legs against the respective faces of the belt and then fitting a relatively soft metal plate extending a full width of the belt end between the front leg and the front face of the belt. Then staples are driven from the front face of the belt through holes in the front leg, through the plate, and through holes in the back leg and the staple are crimped over on the back leg.

In accordance with the invention a row of such clips are fitted to the belt with a single such metal plate and the staples of the clips at the ends of the row are driven through the respective clips, through the plate, and through the belt before the staples of the clips inward of the row ends. This stabilizes the webbed belt and prevents it from spreading at all when the inward staples are driven therethrough. The staples are pierced through the plate and make their own holes therein when driven therethrough.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
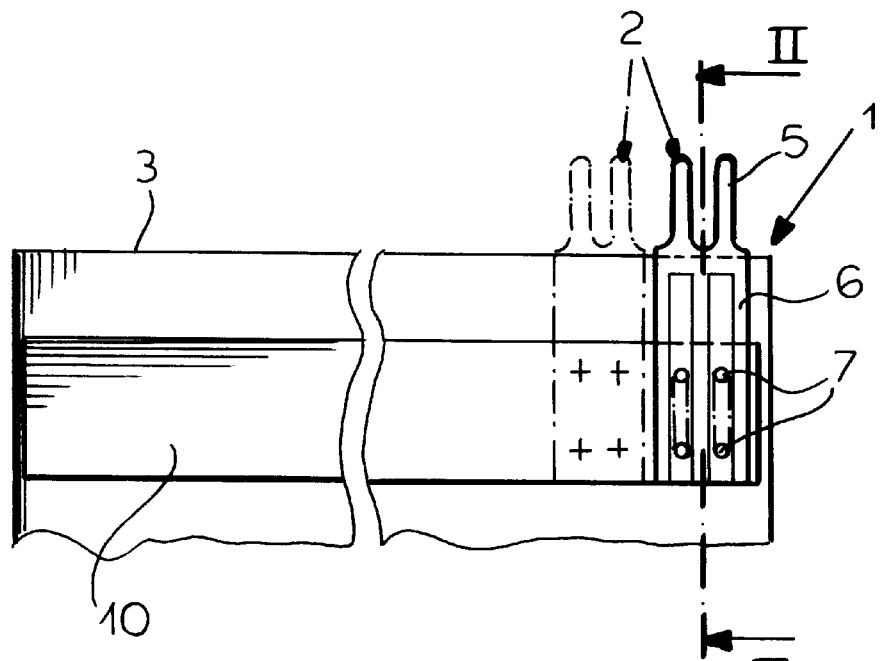
FIG. 1 is a plan view of details of a belt connector according to the invention mounted on a belt end.
Figure 2:
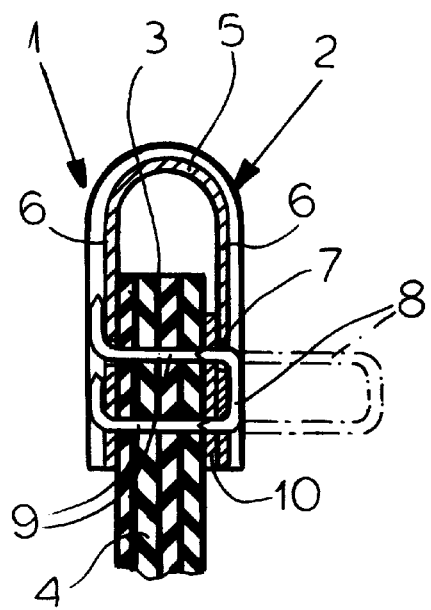
FIG. 2 section taken along line II—II of FIG. 1.
Figure 3:
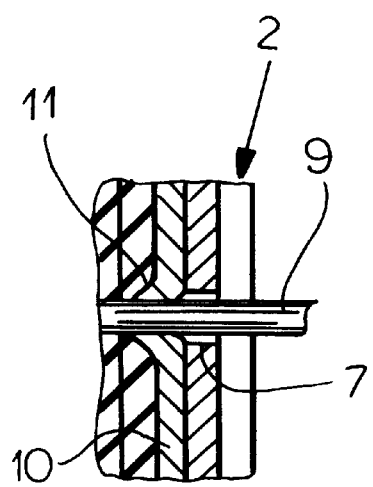
FIG. 3 is an enlarged detail of FIG. 2 in the region of a perforated collar.

FIGS. 1 and 2 show a belt connector 1 with a row of U-shaped connector clips 2 for connecting the webbing ends 3 of a conveyor belt 4 or the like. The connector clips 2 have bight portions 5 and legs 6 which adjoin the portions 5 and which have guide holes 7-disposed one above the other for hard metal staples 8. The fixing staples 8 are driven through the guide holes 7, in each case penetrating the webbing end 3 inserted between the clip legs 6. The points of legs 9 of the staples 8 are bent over.

A soft metal plate 10 of predetermined plate thickness is disposed on the entry side between the top clip legs 6 and the associated webbing end 3. This plate 10 extends over the entire belt width and covers from below the guide holes 7 on the entry side. The pins 9 of the driven-in staples 8 penetrate the metal plate 10. The metal plate 10 is anchored in the surface of the webbing end 3 by means of perforated trumpet-shaped collars 11 that are formed by the staple pins 9 when they are driven and pierced through the plate 10 and belt end 3

According to the embodiment the metal plate 10 is constructed as a soft steel plate of predetermined thickness, width and strength. The fixing staples 8 are constructed as hard steel staples.

To prevent the belt end 3 from spreading, the staples 8 for the two end clips 2 are driven first. Once they are solidly connected with the inextensible metal plate 10 between them, spreading of the web end 3 is impossible.

I claim:

1. A connector for a flat belt having an end with front and back faces, the connector comprising:

a, U-section end clip having front and back legs adapted to embrace the belt end against the respective faces thereof and a bight portion interconnecting outer ends of the legs, each leg being formed with at least two throughgoing holes that align with the holes of the leg on the opposite face of the belt;

a relatively soft metal plate extending a full width of the belt end and lying between the front leg and the front face of the belt; and staples driven through the holes from the front face of the belt, piercing through the soft metal plate, and crimped over on the back leg.

2. The belt connector defined in claim 1 wherein the plate forms collars projecting into the belt around the staple where the staple is pierced through the plate.

3. The belt connector defined in claim 2 wherein the plate is made of a nonferrous metal or of sheet metal.

4. The belt connector defined in claim 1 wherein the staples have the following percentage composition by weight:

C=0.70 to 0.90

Mn=0.50 to 0.80

P<0.035

S<0.035

Si<0.20 to 0.40.

5. A method of mounting a belt connector on a belt end with front and back faces, the method comprising the steps of:

fitting to the belt a U-section end clip having front and back legs and a bight portion interconnecting outer ends of the legs with the legs against the respective faces of the belt;

fitting a relatively soft metal plate extending a full width of the belt end between the front leg and the front face of the belt; and driving staples from the front face of the belt through holes in the front leg, through the plate, and through holes in the back leg and crimping the staple over on the back leg.

6. The method defined in claim 5 wherein a row of such clips are fitted to the belt with a single such metal plate and the staples of the clips at the ends of the row are driven through the respective clips, through the plate, and through the belt before the staples of the clips inward of the row ends.

7. The method defined in claim 5 wherein the staples are pierced through the plate and make their own holes therein when driven therethrough.

* * * * *